(12) United States Patent
Beals

(10) Patent No.: US 8,385,542 B2
(45) Date of Patent: Feb. 26, 2013

(54) METHODS AND APPARATUS FOR SECURING COMMUNICATIONS BETWEEN A DECRYPTION DEVICE AND A TELEVISION RECEIVER

(75) Inventor: William Michael Beals, Englewood, CO (US)

(73) Assignee: Nagrastar L.L.C., Englewood, CO (US)

( * ) Notice: Subject to any disclaimer, the term of this patent is extended or adjusted under 35 U.S.C. 154(b) by 373 days.

(21) Appl. No.: 12/430,659

(22) Filed: Apr. 27, 2009

(65) Prior Publication Data

US 2010/0272257 A1 Oct. 28, 2010

(51) Int. Cl.
*H04L 29/06* (2006.01)

(52) U.S. Cl. .................. 380/200; 380/212; 380/217

(58) Field of Classification Search .................. 380/200, 380/212, 217
See application file for complete search history.

(56) References Cited

U.S. PATENT DOCUMENTS

| | | | |
|---|---|---|---|
| 7,254,236 B1 | 8/2007 | Eskicioglu et al. | |
| 2005/0097053 A1* | 5/2005 | Aaltonen et al. | 705/51 |
| 2007/0104097 A1 | 5/2007 | Rassool | |
| 2009/0228929 A1* | 9/2009 | Cass | 725/58 |
| 2010/0121974 A1* | 5/2010 | Einarsson et al. | 709/231 |

FOREIGN PATENT DOCUMENTS

| | | |
|---|---|---|
| EP | 1418750 A1 | 5/2004 |
| WO | 2008/139335 A1 | 11/2008 |

OTHER PUBLICATIONS

Dunn, "Digital Video Compression Explained", Windows XP, Nov. 1, 2002, http://www.microsoft.com/windowsxp/using/moviemaker/expert/digitalvideo.mspx, pp. 1-2.*
Santis De A, et al; "A Blocker-Proof Conditional Access System"; IEEE Transactions on Consumer Electronics, IEEE Service Center: New York, NY, US; May 1, 2004; vol. 50, No. 2, pp. 591-596.
International Search Report for PCT/US10/32284 mailed on Aug. 5, 2010.

* cited by examiner

*Primary Examiner* — Oscar Louie
*Assistant Examiner* — Lisa Lewis
(74) *Attorney, Agent, or Firm* — Merchant & Gould, P.C.

(57) ABSTRACT

Techniques are described herein for securing communications in a television transmission network. A television receiver receives encrypted content from a transmission network and the encrypted content is input into a decryption device. The decryption device decrypts the encrypted content and generates supplemental data in order to pad the size of the decrypted content. The padded content may then be output from the decryption device to other components of the television receiver, for further processing, such as decoding and output to an associated presentation device.

11 Claims, 5 Drawing Sheets

US 8,385,542 B2

METHODS AND APPARATUS FOR SECURING COMMUNICATIONS BETWEEN A DECRYPTION DEVICE AND A TELEVISION RECEIVER

SUMMARY

Television receivers, such as satellite decoders, receive encrypted audio/video content from a service provider and process the content for output to an associated presentation device. Because bandwidth of the system is limited, content is compressed during transmission. Television receivers include a conditional access system for decrypting the content received from the content provider. In one implementation, a transport stream is received by a tuner of the satellite receiver which extracts selected audio/video content in an encrypted format for a selected channel. The encrypted audio/video content is input into a decrypter that decrypts the audio/video content and outputs the unencrypted content to an audio/video decoder. The audio/video decoder decodes the compressed content and outputs the uncompressed content to an associated presentation device for viewing by a user.

As part of the security of the system, a content provider may transmit control words through the transport stream which are used by the television receiver to decrypt the audio/video content. More particularly, a smart card of the television receiver receives a small data stream from the tuner containing encrypted control words and decrypts the control words for input to the decrypter. The decrypter utilizes the control words to decrypt the encrypted audio/video content. The size of the control words transferred between the smart card and the decrypter is relatively small (e.g., several bytes per second) compared with the size of the audio/video content transferred between the tuner and the decrypter (e.g., several mega bytes of data per second).

One problem with these systems is that signal thieves intercept the data transferred between the smart card and the decrypter and share the control words from an authorized television receiver with other unauthorized receivers. Because the control words are relatively small in size, they can be shared over the internet with other television receivers in real-time. Another unauthorized receiver may receive the intercepted control words and input the same into its decrypter, allowing the television receiver to decrypt the incoming audio/video content without paying the content provider for the content.

BRIEF DESCRIPTION OF THE DRAWINGS

The same number represents the same element or same type of element in all drawings.

DETAILED DESCRIPTION

Figure 1:
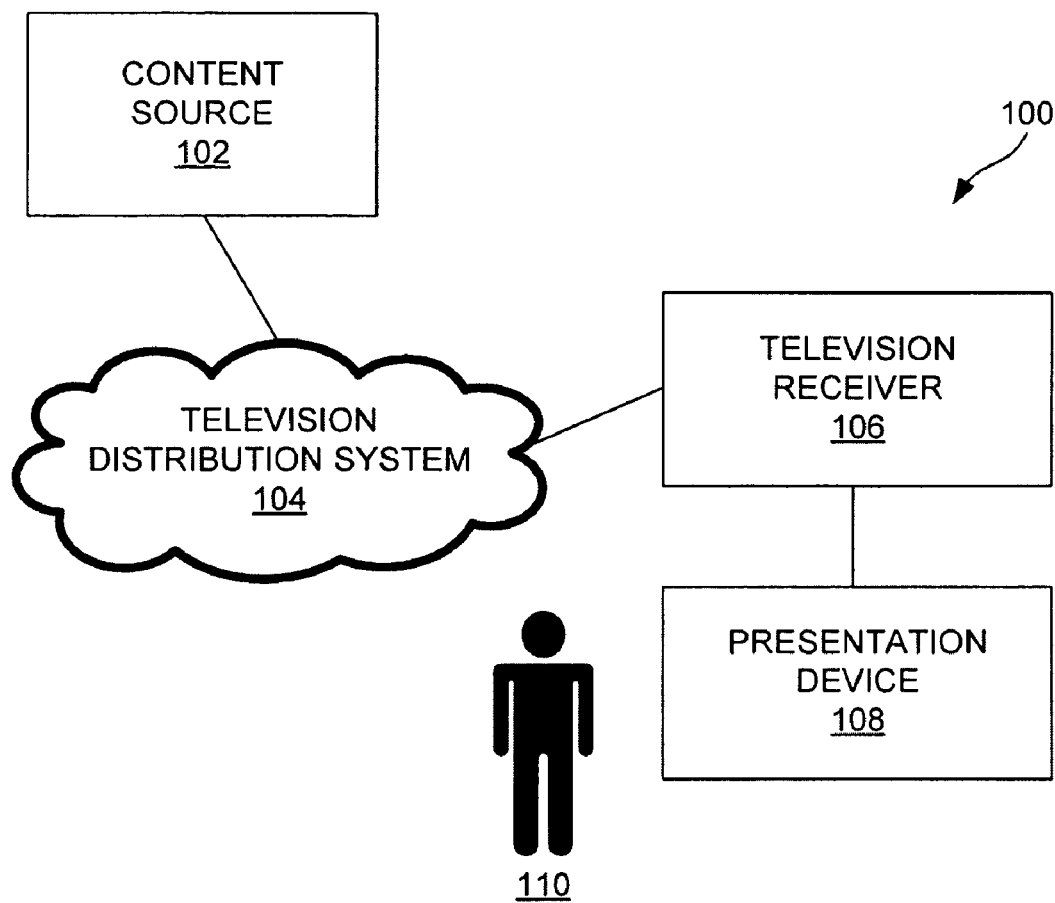
FIG. 1 illustrates an embodiment of a communication network.

The various embodiments described herein generally provide apparatus, systems and methods which facilitate the reception, processing, and outputting of content from one or more sources for presentation to end-users. More particularly, the various embodiments described herein provide techniques for securing communications in a television transmission network. A television receiver receives network encrypted content from a transmission network and the encrypted content is input into a decryption device, such as a smart card. The decryption device decrypts the encrypted content and generates supplemental data in order to pad the size of the decrypted content when outputted from the decryption device. The padding may increase the size of the decrypted content by multiple factors (e.g., 2× or more). The padded content may then be output from the decryption device to other components of the television receiver, for further processing, such as decoding and output to an associated presentation device. In short, described herein are techniques for securing communications between various components of a television receiver.

In at least one embodiment, the decryption device receives encrypted audio/video content and encrypted control words from the television receiver, e.g., a tuner of the television receiver. For example, compressed audio and video data components may be identified by multiple packet identifiers (PIDs) in an MPEG transport stream and the associated control words may be identified by another PID of the MPEG transport stream. The decryption device decrypts the control words and utilizes the control words to decrypt the encrypted audio/video content. The decryption device generates supplemental data, e.g., signature data or dummy data in order to increase the size of the stream outputted by the decryption device. For example, the supplemental data may increase the bit rate of the output stream by 2×, 3×, 4×, 5× or more factors of data rate of the input audio/video content. In at least one embodiment, the decryption device cryptographically combines the audio/video content and the supplemental content to generate an expanded output stream. Thus, in some embodiments, the audio/video content may not be easily separated from the supplemental content without decryption of the expanded output stream.

The output stream is transmitted from the decryption device to a communicatively coupled local decrypter of the television receiver. The local decrypter decrypts the output stream and separates the supplemental data from the audio/video content. The audio/video content is then input to an audio/video decoder that decompresses the content and outputs the content for presentation by a presentation device.

In the techniques described above, the data rate of the output stream transferred between the decryption device and the local decrypter is factors in size larger than the data rate of the encrypted content received by the television receiver. For example, the data rate of encrypted content for a particular program received by the television receiver may be 20 MB/s, whereas the data stream output by the decryption device may be expanded to a data rate of 100 MB/s with the inclusion of the supplemental data. Thus, it is more difficult to share a data stream that is 100 MB/s between multiple receivers over the internet than sharing control words which may be several bytes per second. Advantageously, the described techniques make control word sharing more difficult for signal thieves, making it easier for content providers to secure communications between a decryption device and a television receiver.

The techniques for processing transmitted content are described herein in the context of a receiver utilizing a smart card for decrypting content. However, it is to be appreciated that the techniques described herein may also be utilized in similar decryption devices, such as smart chips, personal computer memory card international association (PCMCIA)

cards, conditional access modules, CableCards, M-Cards or any appropriate decryption device. Further, while the techniques described herein are discussed in the context of receiving audio/video content, it is to be appreciated that the techniques described herein may also be utilized for receivers that receive and process any type of data. For example, the techniques may be applied to receivers for video content (e.g., security systems), audio content (e.g., satellite radio) or data content (e.g., stock tickers or sports scores).

FIG. 1 illustrates an embodiment of a communication network 100. The communication network includes a content source 102, a television distribution system 104, a television receiver 106 and a presentation device 108. Each of these components will be discussed in greater detail below. The communication network 100 may include other components, elements or devices not illustrated for the sake of brevity.

The content source 102 is operable for receiving, generating and communicating content to one or more television receivers 106. The content to be received, processed, outputted and/or communicated may come in any of various forms including, but not limited to, audio, video, data, information, or otherwise. In at least one embodiment, the content source 102 is operable for receiving various forms and types of content from other sources, aggregating the content and transmitting the content to the television receiver 106 through the television distribution system 104. It is to be appreciated that the content source 102 may receive practically any form and/or type of information from one or more sources including streaming television programming, recorded audio or video, electronic programming guide data and the like.

The television distribution system 104 is operable to transmit content from the content source 102 to the television receiver 106. The television distribution system 104 may comprise any type of wired (e.g., cable and fiber) and/or wireless (e.g., cellular, satellite, microwave, and other types of radio frequency) communication medium and any desired network topology (or topologies when multiple mediums are utilized). Exemplary television distribution systems 104 include terrestrial, cable, satellite and internet protocol television (IPTV) distribution systems. In at least one embodiment, the television distribution system 104 broadcasts or multicasts content to a plurality of television receivers 106. The television distribution system 104 may also distribute content to a specific addressable television receiver 106, such as video-on-demand and the like. In at least one embodiment, the content source 102 may be embodied as a transmission facility of the television distribution system 104. Exemplary content sources 102 include over-the-air (OTA) terrestrial transmission facilities, cable television distribution headends, satellite television uplink centers, broadband or internet servers and the like.

The television receiver 106 is operable to receive content from the television distribution system 104 and output the received content for presentation by the presentation device 108. In at least one embodiment, the presentation device 108 is a display device (e.g., a television) configured to display content to a user 110. The television receiver 106 may receive an audio/video stream in any format (e.g., analog or digital format) and output the audio/video stream for presentation by the presentation device 108. In at least one embodiment, the television receiver 106 is a set-top box (e.g., a satellite television receiver, cable television receiver, terrestrial television receiver, internet protocol television (IPTV) receiver or any other type of receiver/converter box) or other similar device that processes and provides one or more audio and/or video output streams to the presentation device 108 for presentation to the user 110. The television receiver 106 may be further configured to output menus and other information that allow the user 110 to control the output of audio/video content by the television receiver 106, view electronic programming guides (EPGs), set recording timers and the like.

The presentation device 108 may comprise any type of device capable of receiving and outputting a video signal in any format. Exemplary embodiments of the presentation device 108 include a television, a computer monitor, a liquid crystal display (LCD) screen, a touch screen and a projector. The presentation device 108 and the television receiver 106 may be communicatively coupled through any type of wired or wireless interface. For example, the presentation device 108 may be communicatively coupled to the television receiver 106 through a coaxial cable, component or composite video cables, an HDMI cable, a VGA or SVGA cable, a Bluetooth or WiFi wireless connection or the like. In some embodiments, the television receiver 106 and the presentation device 108 may be integrated as a device combining the functionality of a display device and a television receiver, such as a television with integrated CableCard functionality.

Figure 2:
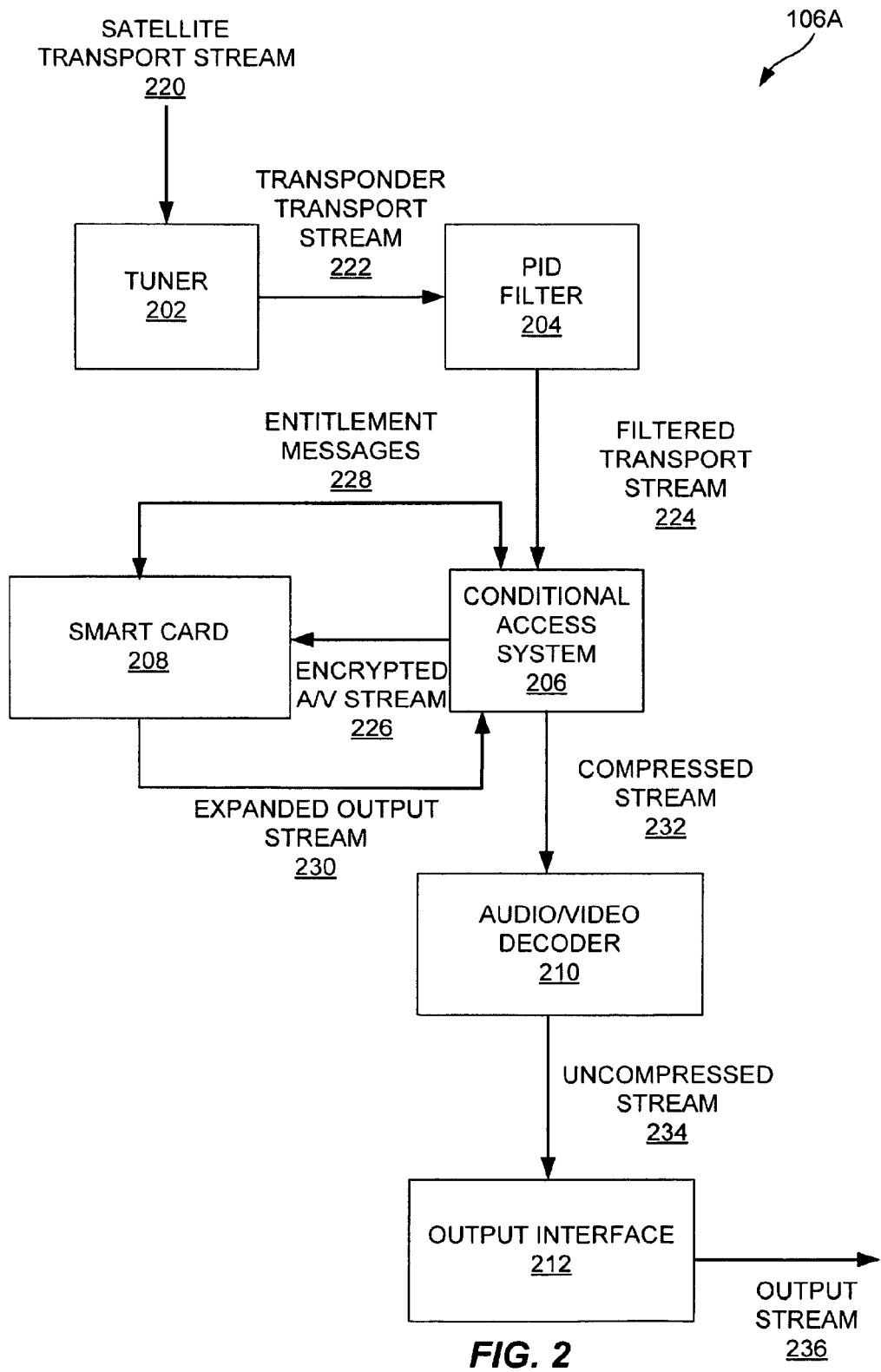
FIG. 2 illustrates a block diagram of an embodiment of a television receiver of FIG. 1.

FIG. 2 illustrates a block diagram of an embodiment of a television receiver of FIG. 1. FIG. 2 will be discussed in reference to the communication network 100 illustrated in FIG. 1. The television receiver 106A will be described in the context of a satellite television receiver. However, it is to be appreciated that the techniques described herein may be applied to other types of television receivers or even other types of data receiving equipment (e.g., satellite radio receivers or data receiving, processing and display device). The television receiver 106A includes a tuner 202, a PID filter 204, a conditional access system 206, a smart card 208, an audio/video decoder 210 and an output interface 212. Each of these components is discussed in greater detail below. The television receiver 106A may include other components, elements or devices not illustrated for the sake of brevity.

The tuner 202 is operable to receive a satellite transport stream 220 from the content source 102 (see FIG. 1). More particularly, the satellite transport stream 220 includes data associated with multiple transponders of the television distribution receiver 104. The user 110 provides input to the television receiver 106A requesting to view a particular television channel. For example, the user 110 may select a channel for viewing using a remote control (not shown in FIG. 1) associated with the television receiver 106A. The tuner 202 is operable to identify a transponder carrying the selected channel and extract data associated with the particular transponder to generate a transponder transport stream 222. In at least one embodiment, the television receiver 106A may comprise multiple tuners utilized to tune multiple television programs carried on multiple transponders of the television distribution receiver 104 simultaneously.

The transponder transport stream 222 may include programming associated with a plurality of channels of a television provider as well as other data, such as electronic programming guide data. For example, the transport stream may include programming from a sports channel, a movie channel and a news channel, electronic programming guide data, entitlement control messages (ECMs) and entitlement management messages (EMMs) multiplexed together. In at least one embodiment, the audio/video content in the transponder transport stream 222 is received in a compressed format, e.g., MPEG-2 or MPEG-4 format. Portions of the data in the transponder transport stream 222 may be encrypted while other portions of the transponder transport stream 222 may be unencrypted. The various components within the transponder transport stream 222 may be identified by unique PIDs. For example, video data associated with the sports channel may be associated with a first PID and audio data associated with the sports channel may be associated with a second PID. Similarly, control words utilized to decrypt the content may be associated with a third PID of the transport stream.

In at least one embodiment, the tuner 202 transmits the transponder transport stream 222 to the PID filter 204. The PID filter 204 is operable to extract the PID streams associated with a particular channel selected for viewing by the user 110 to generate the filtered transport stream 224. The PID filter 204 provides a filtered transport stream 224, including selected PIDs, to the conditional access system 206 for decryption of the encrypted audio/video content contained therein. For example the PID filter may extract programming associated with a selected channel (e.g., a movie channel or a sports channel) from the transponder transport steam 222 to generate the filtered transport stream 224. In at least one embodiment, the transponder transport stream 222 includes unencrypted portions and the tuner 202 may also be communicatively coupled to the audio/video decoder 210 to provide the transponder transport stream 222 to the audio/video decoder 210.

The conditional access system 206 is operable to interface with the smart card 208 to decrypt the filtered transport stream 224. The filtered transport stream 224 may include encrypted audio/video content (e.g., audio and video data associated with a particular program) as well as encrypted key information used to decrypt the audio/video stream. In some embodiments, video data may be encrypted while the audio data is unencrypted. Thus, in at least one embodiment, the filtered transport stream 224 includes encrypted video data but not audio data. The encrypted key information may include for example ECMs and EMMs, which are utilized to decrypt the encrypted audio/video stream in the filtered transport stream 224. An EMM is related to the authorization of services by the content provider. Essentially, an EMM authorizes a particular television receiver 106A or a particular group of television receivers 106A, such as a particular geographic region, to access specified services (e.g., particular television programming). The EMM and ECM are utilized to derive control words, which are utilized as input from decryption selected audio/video content. The EMM and the ECM may be updated as appropriate by the operator of the television distribution system 104 depending on desired design criteria.

The conditional access system 206 is communicatively coupled to the smart card 208. In at least one embodiment, the conditional access system 206 includes a socket for receiving the smart card 208. For example, the socket of the conditional access system 206 may electrically engage pads of the smart card 208 to communicatively couple other circuitry of the conditional access system 206 with the input and output ports of the smart card 208, such as the tuner 202. The conditional access system 206 may provide an encrypted audio/video stream and entitlement messages 228 to the smart card 208 for further processing. The entitlement messages 228 may be bidirectionally communicated between the smart card 208 and the conditional access system 206. The encrypted audio/video stream 226 includes the encrypted audio/video content received by the conditional access system 206 in the filtered transport stream 224. The entitlement messages 228 include EMMs, ECMs and other similar data received by the conditional access system 206 as part of the filtered transport stream 224. In at least one embodiment, the encrypted audio/video stream 226 is encrypted in accordance with a network or broadcast encryption algorithm implemented by the operator of the television distribution system 104. For example, the smart card 208 may utilize and decrypt information within the EMMs and the ECMs to derive a control word, which is a key for descrambling the encrypted audio/video stream 226. The decryption process yields an unencrypted audio/video stream within the smart card 208.

The unencrypted audio/video stream is then padded with other data and outputted as the expanded output stream 230. In other words, the smart card 208 outputs more information in the expanded output stream 230 than the input it receives in the encrypted audio/video stream 226. The smart card 208 is operable to generate supplemental information for output within the expanded output stream 230. The supplemental information pads the size of the unencrypted audio/video stream when output by the smart card 208 in the expanded output stream 230. The combination of the unencrypted audio/video stream and the supplemental information generates an expanded output stream 230 that is relatively larger than the corresponding audio/video content received by the smart card 208 within the filtered transport stream 224. In at least one embodiment, the expanded output stream 230 may be factors in size greater than the encrypted audio/video stream 226 (e.g., 2×, 3×, 4×, 5× plus or greater).

In at least one embodiment, the data rate of the expanded output stream 230 may be five times greater than the data rate of the encrypted audio/video stream 226 received by the smart card 208. For example, if the smart card 208 receives the encrypted audio/video stream 226 at a data rate of 20 MB/s, then the data rate of the corresponding expanded output stream 230 may be 100 MB/s. Thus, in at least on embodiment, the supplemental information output by the smart card 208 is at least four times the size of the audio/video content received by the smart card 208.

The supplemental information may comprise any type of data utilized by the smart card 208 to pad to the size of the expanded output stream 230. In at least one embodiment, the supplemental information may include signature data or other identifying data regarding the smart card 208, the television receiver 106A and/or the source of the content. For example, the supplemental information may include a serial number of the smart card 208 and/or the television receiver 106A. In at least one embodiment, the supplemental information may include dummy/null data. In other words, the supplemental information includes data that has no meaning other than padding the size of the expanded output stream 230. In at least one embodiment, the supplemental information may include portions of the audio/video content. In other words, the expanded output stream 230 may include multiple copies of the same data.

In at least one embodiment, the smart card 208 is operable to cryptographically combine the supplemental information and the audio/video content which comprise the expanded output stream 230. In other words, the smart card 208 may combine the supplemental information and the audio/video content and encrypt the resulting combination such that the two components are inseparable without decryption of the expanded output stream 230. In at least one embodiment, the algorithm utilized to encrypt the expanded output stream 230 may be different than the algorithm utilized to encrypt the encrypted audio/video stream 226 received from the content source 102 by the television receiver 106A. For example, the expanded output stream 230 may be encrypted/decrypted using keys embedded within the smart card 208 and the conditional access system 206. In some embodiments, the expanded output stream 230 may be encrypted/decrypted using dynamically changing keys communicated between the smart card 208 and the conditional access system 206 or utilizing keys generated based on output of a pseudo random number generator depending on desired design criteria.

The conditional access system 206 is operable to receive the expanded output stream 230 and separate the expanded output stream 230 into the constituent components, e.g., the supplemental information and the audio/video content. If the expanded output stream 230 is encrypted, then the conditional access system 206 is operable to decrypt the expanded output stream 230 and extract the audio/video content, which may be in a compressed format. The conditional access system 206 outputs the compressed audio/video stream 232 to the audio/video decoder 210 for further processing. In at least one embodiment, other components, such as a transport stream multiplexer, may combine multiple inputs, such as the transponder transport stream 222 and the compressed stream 232 for input to the audio/video decoder 210.

The audio/video decoder 210 is operable to receive the compressed stream 232 and decode the associated content to generate the uncompressed stream 234. In at least one embodiment, the audio/video decoder 210 may comprise multiple components, such as an audio decoder and a video decoder which receive separate inputs and provide separate uncompressed output components, e.g., audio and video components, depending on desired design criteria. The output interface 212 receives the uncompressed stream 234 and converts the audio and video components into an appropriate format for output to the presentation device 108. In at least one embodiment, the output interface 212 is embodied as a modulator that modulates the output stream 236 into one or more audio/video formats. The output interface 212 may incorporate circuitry to output the output stream 236 in any format recognizable by the presentation device 108, including composite video, component video, RF modulation, internet protocol (IP) streaming, SCART, Digital Visual Interface (DVI) and High-Definition Multimedia Interface (HDMI).

Because the link between the conditional access system 206 and the smart card 208 transmits data at a relatively higher data rate than the data rate of the encrypted audio/video stream 224 input to the smart card 208, it is more difficult for signal thieves to share the expanded output stream 230 over the internet with other receivers. Thus, the communications between the conditional access system 206 and the smart card 208 are more secure. In at least one embodiment, the PID Filter 204, the conditional access system 206, the audio/video decoder 210 and/or the output interface 212 may be implemented within a single chip, making it more difficult for signal thieves to share audio/video content without re-encoding the content within the output stream 236.

Figure 3:
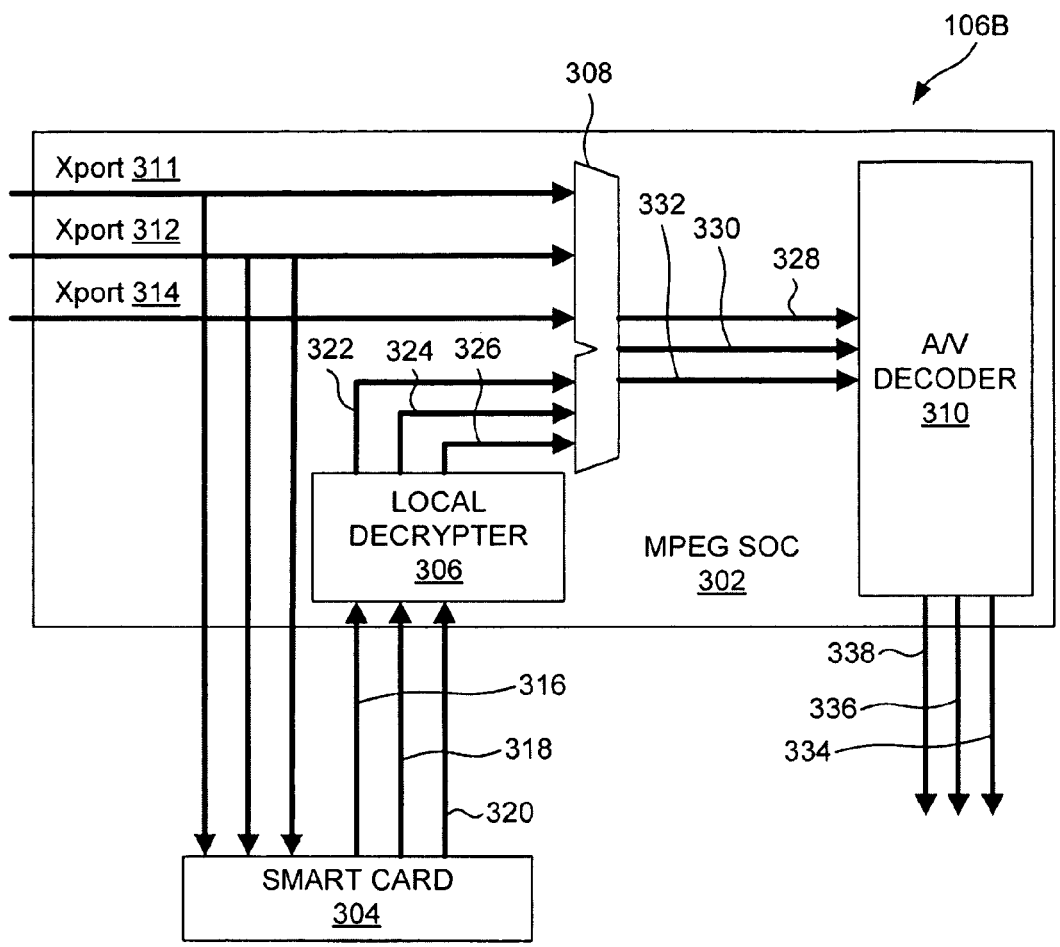
FIG. 3 illustrates another embodiment of a television receiver of FIG. 1.

In at least one embodiment, a smart card may be operable to receive and process an entire transport stream rather than particular components, e.g., particular PIDs. FIG. 3 illustrates another embodiment of a television receiver of FIG. 1. The television receiver 106B includes an MPEG System-on-Chip (SOC) 302 and a smart card 304. The MPEG SOC 302 includes a local decrypter 306, a multiplexer 308 and an audio/video decoder 310. Each of these components are discussed in greater detail below. The television receiver 106B may include other components, elements or devices, such as a tuner, modulator and the like, which are not illustrated for the sake of brevity.

The MPEG SOC 302 receives multiple transport streams 311, 312 and 314 from a tuner of the television receiver 106B (not shown in FIG. 3). Each transport stream 311-314 includes various components, such as multiple audio components, video components and data components associated with various television programs. Some of the transport streams 311-314 may include entitlement information, such as EMMs and ECMs as described above. In at least one embodiment, some portions of the transport streams 311-314 are in encrypted format while other portions of the transport streams 311-314 are unencrypted. For example, video content, associated with a first PID, may be encrypted, whereas audio content, associated with a second PID, may be unencrypted.

The transport streams 311-314 are input to the smart card 304 and the multiplexer 308. The smart card 304 is operable to process the transport streams 311-314 to decrypt the associated audio/video content that has been encrypted using a network encryption process. The smart card 304 is further operable to generate supplemental information as described above and cryptographically combine the unencrypted audio/video content and the supplemental information to generate the expanded output streams 316, 318 and 320.

In at least one embodiment, the smart card 304 is operable to encrypt the expanded output streams 316, 318 and 320 utilizing an encryption process that is at least as computationally intensive as the encryption process utilized to encrypt the transport streams 311-314. For example, the transport streams 311-314 and the expanded output streams 316-320 may all be encrypted using 128 bit encryption processes. The particular encryption processes utilized by the smart card 304 may be selected based on desired design criteria.

The local decrypter 306 is operable to receive and decrypt the expanded output streams 316-320 utilizing a local decryption process. The local decrypter 306 is further operable to separate the audio/video content from the supplemental information within each of the transport streams 316-320 to generate unencrypted transport streams 322-326. The unencrypted transport streams 322-326 are input to the multiplexer 308. The multiplexer 308 operates as a switch to select either the transport streams 311-314 or the unencrypted transport streams 322-326 for output. The selected streams are then output by the multiplexer 308 as the transport streams 328, 330 and 332. In at least one embodiment, if no encryption of a particular transport stream 311-314 is performed by the smart card 304, then the multiplexer 308 selects the appropriate transport stream 311-314 for output rather than its corresponding transport stream 322-326. However, if decryption of a particular transport stream 311-314 is performed by the smart card 304, then the multiplexer 308 selects the unencrypted transport stream 322-326 for output rather than its corresponding transport stream 311-314. The multiplexer 308 may select any combination of the transport streams 311-314 and the unencrypted transport streams 322-326 for output as the transport streams 328-332, depending on desired design criteria and content contained therein. For example, the multiplexer 308 may select the transport streams 311-314 for output, the unencrypted transport streams 322-326 for output or any combination of the transport streams 311-314 and the transport streams 322-326 (such as transport stream 311 and unencrypted transport streams 324 and 326.

The audio/video decoder 310 receives the transport streams 328-332, decodes the compressed audio/video content contained therein and generates the output streams 334, 336 and 338. In at least one embodiment, the output streams 334-338 include uncompressed audio/video content which may then be processed by an output interface (e.g., a modulator) which outputs the data to an associated presentation device 108 (see FIG. 1) in an appropriate format.

Figure 4:
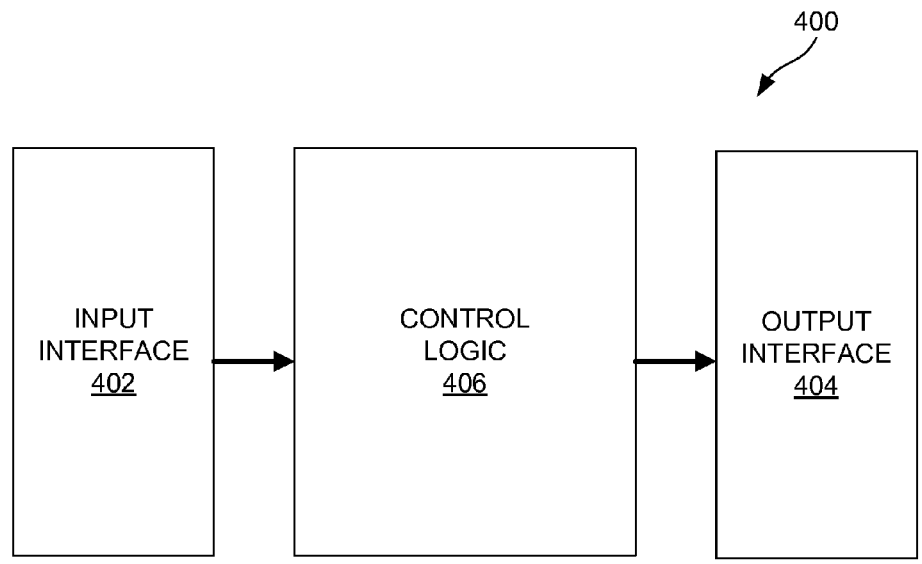
FIG. 4 illustrates an embodiment of a smart card implementing the techniques described herein.

FIG. 4 illustrates an embodiment of a smart card implementing the techniques described herein. The smart card 400 includes an input interface 402, an output interface 404 and control logic 406. Each of these components is discussed in greater detail below. The smart card 400 may include other components, elements or devices not illustrated for the sake of brevity.

The input interface 402 is operable to communicatively couple the smart card 400 to components of a television receiver. In at least one embodiment, the input interface 402 includes one or more pads that electrically couple to a smart card socket of a television receiver. Other wired and wireless electrical interfaces may also be utilized, including wireless radio frequency (RF) communication links, optical communication links and the like. The input interface 402 is operable to receive encrypted audio/video content and other data, such as authorization messages and key information from components of a television receiver, such as a tuner, PID filter, conditional access system, multiplexer and/or control logic of the television receiver. In at least one embodiment, the key information received by the input interface 402 is encrypted. In at least one embodiment, the entitlement messages may be communication between the television receiver and the control logic 406 through an interface separate from the input interface 402. For example, the smart card 400 may include separate input/output pins for communicating entitlement messages with a conditional access system of the television receiver.

Similarly, the output interface 404 is operable to communicatively couple the smart card 400 to components of a television receiver. In at least one embodiment, the output interface 404 includes one or more of pads that electrically couple to the aforementioned smart card socket of the television receiver. In at least one embodiment, the output interface 404 is communicatively coupled to a local decrypter of the television receiver through the smart card socket.

The control logic 406 is operable to control the operation of the smart card 400. The control logic 406 may be a single processing device or a plurality of processing devices that cooperatively operate to control the operation of the smart card 400. The control logic 406 may include various components or modules for decrypting audio/video content encrypted using a network encryption process. In at least one embodiment, the control logic 406 includes a crypto processor for decrypting encrypted audio/video streams received by the input interface 402.

The control logic 406 is further operable to generate supplemental information. The control logic 406 may generate supplemental data using a similar process as described in detail above in the discussion of FIG. 2. The supplemental information may include information identifying the smart card 400 as well as other information, such as dummy data, which is used to pad data output by the output interface 404. The control logic 406 is further operable to combine the supplemental information and the unencrypted audio/video content to generate an expanded output stream transmitted to the television receiver via the output interface 404.

In at least one embodiment, the expanded output stream is encrypted such that the supplemental information and the audio/video content are inseparable without decryption of the expanded output stream. Thus, a local decrypter of the television receiver receives and decrypts the expanded output stream to extract unencrypted audio/video content for further processing by other components of the television receiver, such as an audio/video decoder.

Figure 5:
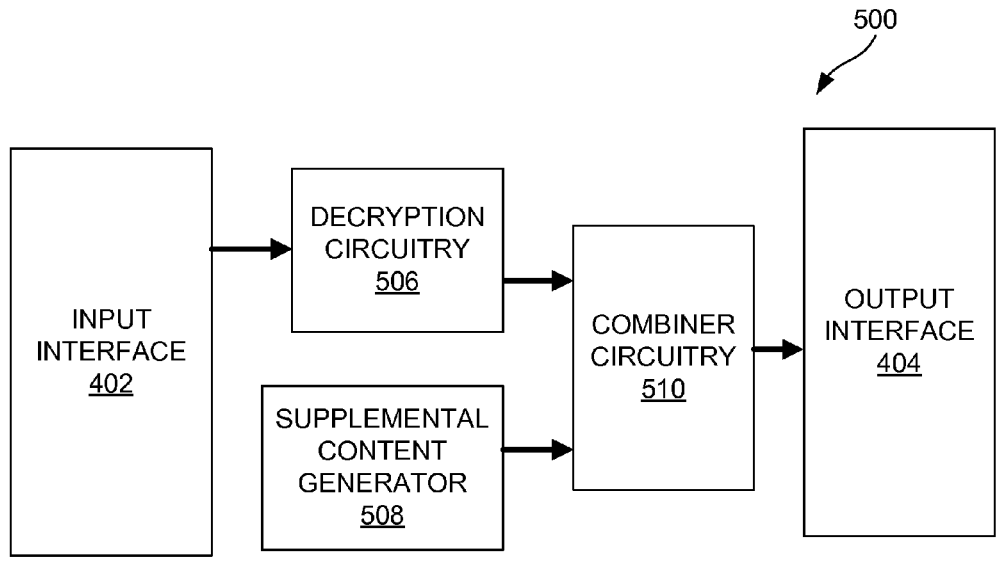
FIG. 5 illustrates another embodiment of a smart card implementing the techniques described herein.

FIG. 5 illustrates another embodiment of a smart card utilizing the techniques described herein. The smart card 500 includes an input interface 402, an output interface 404, decryption circuitry 506, supplemental information generation circuitry 508 and combiner circuitry 510. Each of these components is discussed in greater detail below. The smart card 400 may include other components, elements or devices not illustrated for the sake of brevity and the description of components common to FIG. 5 is omitted herein.

The decryption circuitry 506 is operable to receive and decrypt encrypted audio/video content input to the smart card from an associated television receiver. The decryption circuitry 506 may include circuitry for performing a decryption process using a selected decryption algorithm based on key information provided to the smart card 500 from a television receiver via the input interface 402. For example, the decryption circuitry 506 may utilize decrypt EMMs and ECMs to derive control words. The control words are then utilized as input to decrypt encrypted audio/video content processed by the decryption circuitry 506.

The supplemental information generation circuitry 508 is operable to generate supplemental information. In at least one embodiment, the supplemental information includes identifying information regarding the smart card and/or the associated television receiver. The supplemental information may include any type of information utilized to expand the rate of data output by the smart card 500 depending on desired design criteria. In at least one embodiment, the supplemental information generation circuitry 508 is configured to generate an amount of supplemental information that is determined based on the data rate of the encrypted audio/video content input to the smart card 500 by an associated television receiver. For example, if the data rate of the input audio/video content is 10 MB/s, then the supplemental information generation circuitry 508 may generate supplemental information at a rate of 10 MB/s. However, other data rates of supplemental information are also possible depending on desired design criteria.

In at least one embodiment, the supplemental information generated by the supplemental information generation circuitry 508 may be based upon the encrypted audio/video content input to the smart card 500. In other words, the supplemental information may change depending on the content of the encrypted audio/video content. In some embodiments, the supplemental information may be generated by the supplemental information generation circuitry 508 based on a random or pseudo random number generated independently of the encrypted audio/video content or according to a predefined sequence. Because the majority of the supplemental information outputted by the smart card 500 to an associated television receiver is discarded by a local decrypter in some embodiments, the actual content of the supplemental information may not matter. Thus, any information of sufficient size may be adequate for output by the supplemental information generation circuitry 508.

The combiner circuitry 510 is operable to receive unencrypted audio/video content from the decryption circuitry 506 and the supplemental information from the supplemental information generation circuitry 508 and combine both inputs to generate an expanded output stream. As part of the combination process, the combiner circuitry 510 is operable to encrypt the expanded output stream in accordance with a local encryption process. The expanded output stream is then transmitted by the output interface 404 to components of an associated television receiver for further processing. The local decrypter then performs a corresponding decryption process to decrypt the expanded output stream and extracts the desired data, e.g., the audio/video components.

Figure 6:
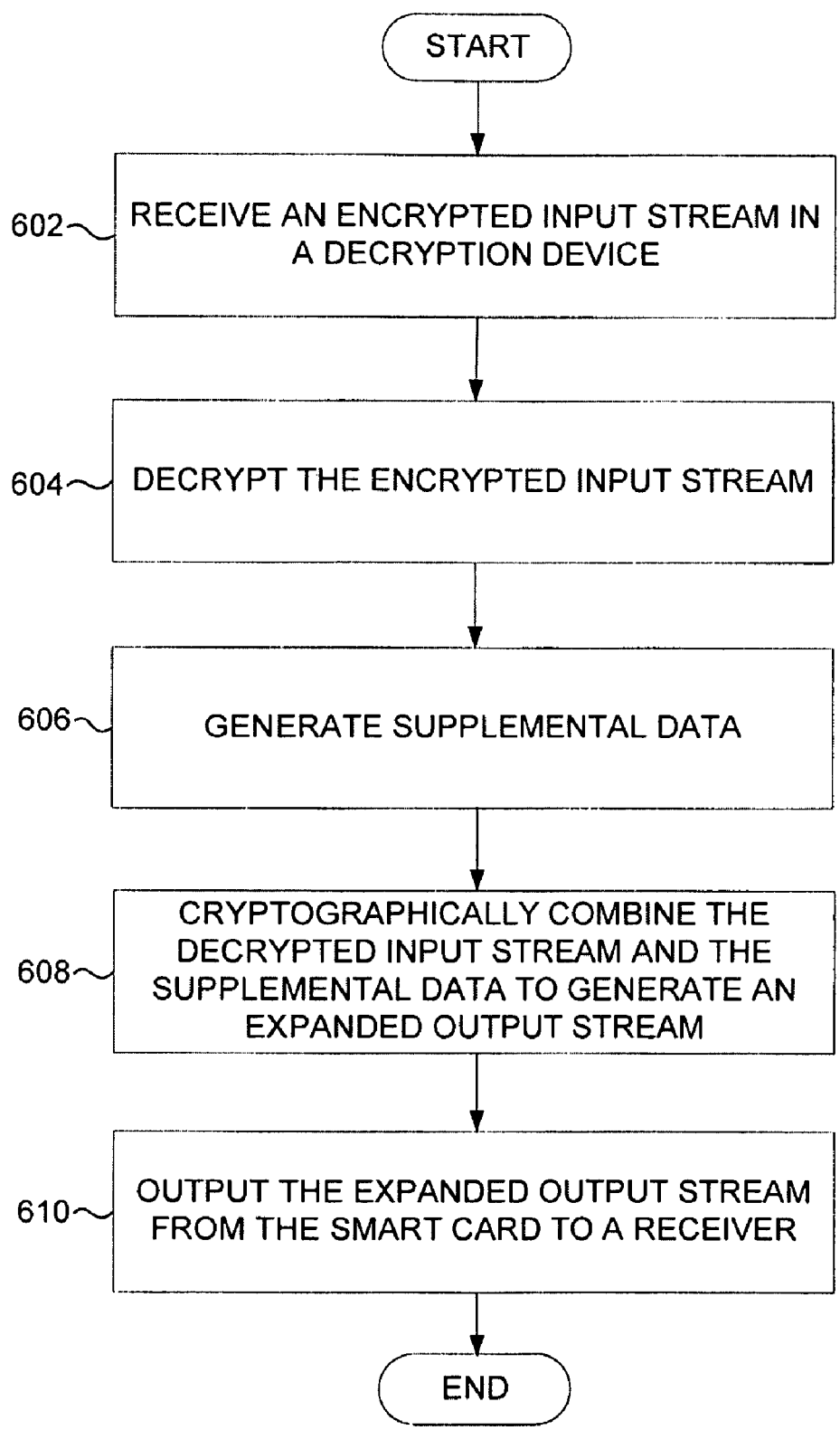
FIG. 6 illustrates an embodiment of a process for receiving an encrypted data stream.

Because the expanded output stream from the smart card 500 is significantly large in size compared with the underlying audio/video, signal thieves cannot intercept the output and share the same with other receivers over the internet as easily as other decryption systems. Further, because the expanded output stream is cryptographically combined, it is not easy to separate the underlying audio/video content from the supplemental information without decrypting the expanded output stream. Advantageously, the expanded output stream of the smart card 500 provides a more secure connection between the smart card 500 and an associated television receiver FIG. 6 illustrates an embodiment of a process for receiving an encrypted data stream. The process of FIG. 6 is operable to receive any type of encrypted data content and decrypt the content for processing by a receiver or system associated with the receiver. In at least one embodiment, the process of FIG. 6 is operable for transferring content from a television receiver to a decryption device for decrypting the network encryption of the content. The process of FIG. 6 may include other operations not illustrated for the sake of brevity.

The process includes receiving an encrypted input stream in a decryption device associated with a receiver (operation 602). In at least one embodiment, the receiver is a television receiver and the encrypted input stream includes compressed audio/video content. The encrypted input stream may additionally include other information, such as key information utilized to decrypt the compressed audio/video content. In at least one embodiment, the decryption device receives the encrypted input stream from an associated television receiver at a first data rate (e.g., 20 MB/s). In other embodiments, the encrypted input stream is associated with a data receiving, processing or presentation device. For example, a presentation device may receive, process and output encrypted stock ticker information, sport scores, news feeds and the like.

The process further includes decrypting the encrypted input stream in the decryption device to extract the content contained therein (operation 604). In at least one embodiment, operation 604 includes extracting compressed audio/video content contained in the encrypted input stream. In other embodiments, other types of data may be compressed within the encrypted input stream, e.g., compressed textual data, image data and the like. The process further includes generating supplemental information in the decryption device (operation 606). The amount of supplemental information generated by the decryption device may be selected depending on desired design criteria, such as how much padding of the audio/video content (or other data) is desired when the audio/video content is output by the decryption device. For example, the supplemental information may have a size equal to the unencrypted audio/video content in at least one embodiment. If more security is desired, then the supplemental information may have a size equal to five times or more the size of the unencrypted audio/video content in at least one embodiment.

The process further includes cryptographically combining the compressed content and the supplemental information in the decryption device to generate an encrypted output stream (operation 608). Depending on the level of security desired, it may be appropriate to encrypt the expanded output stream using an encryption process that is at least as computationally intensive as the process used for the network encryption of the content received by the receiver from the distribution network. For example, the received encrypted audio/video content is encrypted by a distributor using a specific level of network encryption, then the local encryption utilized to transfer the data between the decryption device and the receiver may have a similar level of encryption. The process further includes outputting the encrypted output stream to the receiver at a second data rate that is greater than the first data rate (operation 610).

In at least one embodiment, a television receiver receives the expanded output stream and performs appropriate processing to extract the audio/video content from the expanded output stream. For example, a local decrypter of the television receiver may perform operations including: decrypting the encrypted output stream and separating the compressed audio/video content from the supplemental information in the decrypted output stream. The decrypted output stream may then be provided to other components of the television receiver, such as an audio/video decoder or modulator operable to perform operations including: decompressing the compressed audio/video content and outputting the decompressed audio/video content for presentation by a presentation device. Similar types of processing may be performed by other types of receiving devices to extract appropriate format data from the expanded output stream for processing by the receiver. For example, a receiver may extract stock ticker information from the expanded output stream and transmit the stock ticker information over a local area network to presentation devices for display to users.

Although specific embodiments were described herein, the scope of the invention is not limited to those specific embodiments. The scope of the invention is defined by the following claims and any equivalents therein.

I claim:

1. A method for processing a television transmission signal, the method comprising:
   receiving an encrypted input stream in a decryption device associated with a television receiver, the encrypted input stream including compressed audio/video content, the encrypted input stream received by the decryption device at a first data rate;
   decrypting the encrypted input stream in the decryption device to extract the compressed audio/video content;
   generating supplemental information in the decryption device;
   creating an expanded output stream by combining the compressed audio/video content and the supplemental information in the decryption device;
   encrypting the expanded output stream to create an encrypted output stream;
   transmitting the encrypted output stream to the television receiver at a second data rate that is greater than the first data rate;
   decrypting the encrypted output stream in a local decrypter of the television receiver;
   separating the compressed audio/video content from the supplemental information in the decrypted output stream within the television receiver;
   decompressing the compressed audio/video content within the television receiver;
   outputting the decompressed audio/video content from the television receiver for presentation by a presentation device.

2. The method of claim 1, wherein the second data rate is at least twice the size of the first data rate.

3. The method of claim 1, wherein the second data rate is at least five times the size of the first data rate.

4. The method of claim 1, wherein generating the supplemental information includes:
   generating signature information associated with the decryption device.

5. The method of claim 1, wherein the decryption device comprises a smart card.

6. A television receiver comprising:
   a tuner operable to receive a transport stream and extract encrypted compressed audio/video content associated with a selected channel from the transport stream, the encrypted compressed audio/video content received by the tuner at a first data rate;

a decryption device communicatively coupled to the tuner operable to receive the encrypted compressed audio/video content, decrypt the encrypted compressed audio/video content, generate supplemental information, create an expanded output stream by combining the compressed audio/video content with the supplemental information, and encrypt the expanded output stream to generate an encrypted output stream, the encrypted output stream transmitted by the decryption device at a second data rate that is larger than the size of the first data rate;

a local decrypter communicatively coupled to the decryption device operable to receive and decrypt the encrypted output stream and extract the compressed audio/video content to generate a compressed output stream;

an audio/video decoder communicatively coupled to the local decrypter operable to receive the compressed output stream and decompress the compressed audio/video content to generate a decompressed output stream, the decompressed output stream including decompressed audio and video components; and an output interface communicatively coupled to the audio/video decoder operable to output the decompressed audio and video components to an associated presentation device.

7. The television receiver of claim 6, wherein the second data rate is at least twice the size of the first data rate.

8. The television receiver of claim 7, wherein the second data rate is at least five times the size of the first data rate.

9. The television receiver of claim 6, wherein the supplemental information includes signature information associated with the decryption device.

10. The television receiver of claim 6, wherein a first process used to decrypt the encrypted compressed audio/video content in the decryption device is at least as computationally intensive as a second process used to decrypt the encrypted output stream in the local decrypter.

11. The television receiver of claim 6, wherein the decryption device comprises a smart card.

* * * * *